United States Patent [19]

Ferrando

[11] Patent Number: 5,380,554
[45] Date of Patent: Jan. 10, 1995

[54] CHROMIC OXIDE COATINGS BY THERMAL DECOMPOSITION OF CHROMIC ACID ANHYDRIDE (CRO₃)

[75] Inventor: William A. Ferrando, Arlington, Va.

[73] Assignee: The United States of America as represented by the Secretary of the Navy, Washington, D.C.

[21] Appl. No.: 98,093

[22] Filed: Jul. 28, 1993

[51] Int. Cl.⁶ .................................................. B05D 3/02
[52] U.S. Cl. .................................. 427/226; 427/343; 427/380; 427/419.3; 427/431
[58] Field of Search ............ 427/226, 380, 343, 419.3, 427/431

[56] References Cited

U.S. PATENT DOCUMENTS

| | | | |
|---|---|---|---|
| 3,749,595 | 7/1973 | Foucry | 427/226 |
| 3,956,531 | 5/1976 | Church et al. | 427/226 |
| 3,985,916 | 10/1976 | Church et al. | 427/226 |
| 4,382,104 | 5/1983 | Smith et al. | 427/226 |

*Primary Examiner*—Janyce Bell
*Attorney, Agent, or Firm*—Roger D. Johnson

[57] ABSTRACT

A diamond, ceramic, metal, or metal alloy surface is coated with molten $CrO_3$. The coated surface is then heated in air at a temperature of from about 200° C. to 250° C. until the molten $CrO_3$ coating is converted into a black, powdery adherent coating of CrO.

18 Claims, No Drawings

CHROMIC OXIDE COATINGS BY THERMAL DECOMPOSITION OF CHROMIC ACID ANHYDRIDE (CRO₃)

BACKGROUND OF THE INVENTION

This invention relates to metal oxide coatings and more particularly to chromium oxide coatings.

Chromate coatings have been employed widely in corrosion protection of aluminum alloys and steel. Thermal radiation balance, however, is a second possible use.

There have been initiatives in recent years to find coating methods, in general, which reduce (or eliminate, if possible) the quantity of waste products which must be disposed of and volatiles released into the air due to vehicles or solvents used in the process.

SUMMARY OF THE INVENTION

Accordingly an object of this invention is to provide a new way of producing CrO coatings on metal surfaces.

Another object of this invention is to provide a new method producing CrO coatings on nonmetal surfaces such as ceramics or diamond.

A further object of this invention is to provide a method of producing CrO coatings with reduced amounts of waste products.

These and other objects of this invention are achieved by providing
a process for forming CrO coatings comprising:
A. coating a diamond, ceramic, metal, or metal alloy surface with molten $CrO_3$;
B. heating the molten $CrO_3$ coated surface formed in step A in air at a temperature of from the melting point of $CrO_3$ up to 250° C. until the $CrO_3$ is converted into CrO in the form of an adherent, powdery, black coating.

DETAILED DESCRIPTION OF THE INVENTION

Molten $CrO_3$ has the consistency of thin paint and has excellent wetting properties on materials such as diamond, metals, and ceramic materials. Coatings of molten $CrO_3$ can be applied to the surfaces of these materials by conventional methods such as dipping in a bath, brushes, rollers, sprayers, etc. Surprising, the molten $CrO_3$ coatings can be converted to a somewhat powdery, black, adherent coating of CrO by heating the molten $CrO_3$ in air. The molten $CrO_3$ is heated in air at a temperature of preferably from the melting point of $CrO_3$ to 250° C., more preferably from 200° C. to 240° C., and still more preferably from 210° C. to 230° C. until the molten $CrO_3$ has been converted to CrO. The exact mechanism of the $CrO_3$ conversion to CrO is not known. However, since nitric oxide ($NO_2$) odor was present in the product gas, a possible chemical reaction is as follows:

$$2CrO_3 + N_2 \text{ (from air)} + \text{heat} \rightarrow CrO + 2NO_2.$$

In contrast with this, *Lange's Handbook of Chemistry* 13th ed. (1985), page 4-43, reports that $CrO_3$ decomposes at 250° C. to form green hexagon $Cr_2O_3$. Such determinations, however, are made in sealed containers in the absence of air. It would seem that the presence of air is an important part of the conversion of $CrO_3$ to CrO.

$CrO_3$ has a high solubility in water (167 parts/100 parts at 20° C.). An aqueous solution of $CrO_3$ (preferably saturated) can be applied to the object or surface to be coated. Removal (evaporation) of the water leaves the $CrO_3$ as small reddish crystals on the surface. The surface and $CrO_3$ are then heated to form a coating of molten $CrO_3$ on the surface to be coated. The molten $CrO_3$ is heated in air as described above to convert it to a powdery, black, adherent coating of CrO. Although this procedure may be used in a factory, it is particularly useful to make repair coatings in the field. All that is required is a saturated solution of $CrO_3$ in water and a propane torch (or equivalent device). The $CrO_3$ solution is applied to the surface to be coated. The torch is then used to evaporate off the water, melt the resulting solid $CrO_3$, and finally convert the molten $CrO_3$, coating to an adherent coating of black, powdery, CrO.

Chromate anodic coatings produced by standard or conventional methods of electrolytic treatment in a bath containing chromic acid as described Milspec MIL-A-8625C, Jan. 15, 1968, are usually sealed in a hot sodium dichromate solution (pickled) to increase their durability. It is desirable to treat the black CrO coating produced by the process of the present invention in the same way to increase their durability. Milspec MIL-A-8625C at page 7 describes the hot sodium dichromate process as follows:

"3.11.1.1 Class 1—Sealing shall be accomplished by immersion in a sealing medium such as a 5 percent aqueous solution of sodium dichromate (pH 5.0 to 6.5) for 15 minutes at 178° to 212° F., boiling deionized water, nickel acetate or other suitable chemical solutions. If not otherwise specified, sealing should be in a water solution of the sodium dichromate heated at 208° to 212° F. for enhancing corrosion resistant of the anodic coating."

The processes of this invention can be used to produce CrO coatings on diamond films or particles, on metal or metal alloy surfaces, and on ceramic particles or surfaces. CrO coatings can be produced on steel, aluminum and aluminum alloys, magnesium and magnesium alloys, copper and copper alloys, as well as other metals and alloys. CrO coatings can also be produced on ceramic materials including both oxide and nonoxide ceramic materials. Examples of suitable oxide ceramic materials for CrO coating include zircon, mullite, alumina, cordierite, titanium oxide, silica, celsian, etc. Examples of suitable nonoxide ceramic materials include silicon carbide, silicon nitride, boron carbide, aluminum nitride, boron nitride, etc. Because of the simplicity of the CrO coating process, specific materials are easily tested for suitability for the process. In fact, substantial numbers of candidate materials may be tested at the same time.

The general nature of the invention having been set forth, the following examples are presented as specific illustrations thereof. It will be understood that the invention is not limited to these specific examples but is susceptible to various modifications that will be recognized by one of ordinary skill in the art.

EXAMPLE 1

Coating of an $Al_2O_3$ Surface

A quantity of $CrO_3$ was placed upon an $Al_2O_3$ flat, which was heated on a hot plate (~225° C.) to liquefy the $CrO_3$. The liquid $CrO_3$, which approximates the consistency of a thin paint, was spread about and penetrated the small surface pores of the $Al_2O_3$ ceramic and produced an adherent black CrO coating upon further heating in air at ~225° C. to decomposition.

Such a coating can be used to enhance radiant thermal absorption properties of a ceramic surface (the absorptivity coefficient of chromic oxide (CrO) is 0.6–0.8) for applications requiring improved thermal transfer. Applied to particulate (or whisker) reinforcements such as $B_4C$, BN or C in metal matrix composites, the chromium containing coating might assist matrix metal to reinforcement bonding leading to improve properties of the composite. The interfacial bonding characteristic must be one of moderate strength which resists reinforcement pull out, but does not contribute greatly to crack propagation.

EXAMPLE 2

Plating on an Aluminum Alloy

Two pieces of 6061 Al ($\frac{3}{4}"\times1"\times1\ 7/8"$) were cleaned by glass bead blasting. One coupon was coated with $CrO_3$ by dipping it in a saturated water solution of $CrO_3$ and allowed to dry on a hot plate at about 50° C. The coupon was transferred to an oven and heated to about 225° C. for several minutes. A dark continuous adherent coating was observed on the sample surface.

The uncoated and coated coupons were compared in simple, but very aggressive corrosion test. (A previous attempt simple salt water over several days yielded insufficient corrosion of either sample for measurement by weighing.) A 5% KOH water solution was prepared and maintained at 55° C. Both the coated and uncoated coupons were placed in the solution for a period of 2.5 hours. Corrosion action was quite vigorous with a constant stream of bubbles, especially from the uncoated coupon. The results of the corrosion test are given in the Table below.

| | Corrosion Test | | |
|---|---|---|---|
| | Initial Weight | Final Weight | Comments |
| Coated | 17.94 g | 17.39 g | Corrosion apparent only at coating imperfections (pitting like). KOH solution did not undercut coating. |
| Uncoated | 17.73 | 15.38 g | Rapid Uniform Corrosion |

EXAMPLE 3

Coating of Diamond Film

Synthetic diamond films are now routinely produced, under proper conditions, by application of an acetylene flame. These have potential use as heat conducting substrates for integrated circuit electronic packages and as windows for radar devices. The latter application will require a coating to retard ablation of the diamond film due to elevated temperature oxidation. This must be an oxide or similar coating to maintain nonmetallic character for radar penetration. Some success, in this regard, has been achieved with a boron nitride (BN) spray coating and the like, but better coatings will be needed.

A small portion of diamond film in the form of a flake was obtained. This was dipped in a saturated aqueous solution of $CrO_3$. The diamond film was dried on a hot plate at 50° C. for several minutes and then heated to about 225° C. to melt and decompose the compound as in example 2. The small flake of diamond was completely coated with the CrO with apparently good adherence. The coating was relatively rough, however, and therefore some care obviously will need to be taken in applying the $CrO_3$ more uniformly.

EXAMPLE 4

Coating of Steel

A coupon of HY80 steel was cleaned by glass bead blasting. The steel coupon was coated with $CrO_3$ by dipping it in a saturated water solution of $CrO_3$ and allowed to dry on a hot plate at about 50° C. The coupon was transferred to an oven and heated to about 225° C. for several minutes. A uniform black chrome film was deposited on the steel.

Several large steel bolts were coated similarly. These were subjected to a four month alternate immersion seawater corrosion test. The degree of corrosion which resulted indicates that the black CrO coating produced by this method must be used with an appropriate sealing paint overcoat in the case of a steel surface to be effective.

On steel the combination of a CrO coating covered with a sealing paint overcoat is superior to either the CrO coating or the sealing paint coating alone. The CrO coating on steel requires the tougher sealing paint coating to hold it in place. On the other hand, without the CrO coating small punctures or abrasions in the sealing paint coating will result in large areas of corrosion on the steel surface that will undermine the paint coating. Thus the strength of each coating compensates for the weakness of the other.

Obviously, numerous other modifications and variations of the present invention are possible in light of the foregoing teachings. It is therefore to be understood that within the scope of the appended claims the invention may be practiced otherwise than as specifically described.

What is claimed is:

1. A process for forming CrO coatings comprising:
   A. coating a diamond, ceramic, metal, or metal alloy surface with molten $CrO_3$; and
   B. heating the molten $CrO_3$ coated surface formed in step A in air at a temperature of from the melting point of $CrO_3$ up to 250° C. until the $CrO_3$ is converted into CrO in the form of an adherent, powdery, black coating.

2. The process of claim 1 wherein the molten $CrO_3$ coated surface is heated in step B at a temperature of from 200° C. to 240° C.

3. The process of claim 2 wherein the molten $CrO_3$ coated surface is heated in step B at a temperature of from 210° C. to 230° C.

4. The process of claim 1 wherein in step A the $CrO_3$ is in molten form when it is applied to the surface.

5. The process of claim 1 wherein step A is accomplished by
   (1) applying an aqueous solution of $CrO_3$ to the surface to be coated,
   (2) removing the water to leave crystals of $CrO_3$ on the surface, an
   (3) melting the $CrO_3$ crystals to form a molten $CrO_3$ coating on the surface.

6. The process of claim 5 wherein in step A(1) a saturated aqueous $CrO_3$ solution is used.

7. The process of claim 8 wherein a diamond surface is coated.

8. The process of claim 1 wherein the surface that is coated is a metal surface or a metal alloy surface.

9. The process of claim 8 wherein a steel surface is coated.

10. The process of claim 8 wherein the surface that is coated is an aluminum surface or an aluminum alloy surface.

11. The process of claim 1 wherein a ceramic surface is coated.

12. The process of claim 11 wherein an oxide ceramic surface is coated.

13. The process of claim 12 wherein the oxide ceramic is zircon, mullite, alumina, cordierite, titanium oxide, silica, or celsian.

14. The process of claim 13 wherein a alumina surface is coated.

15. The process of claim 11 wherein a nonoxide ceramic surface is coated.

16. The process of claim 11 wherein the nonoxide ceramic is silicon carbide, silicon nitride, boron carbide, aluminum nitride, or boron nitride.

17. A process for forming CrO coatings comprising:
  A. coating a diamond, ceramic, metal or metal alloy surface with molten $CrO_3$;
  B. heating the molten $CrO_3$ coated surface formed in step A in air at a temperature of from the melting point of $CrO_3$ up to 250° C. until the $CrO_3$ is converted into CrO in the form of an adherent, powdery, black coating; and
  C. toughening the powder, black CrO coating produced by step B by heating it in boiling deionized water or an aqueous sodium dichromate solution at a temperature of from 178° F. to 212° F.

18. The process of claim 17 wherein the CrO coating is toughened by heating it in a aqueous sodium dichromate solution at a temperature of from 208° F. to 212° F.

* * * * *